United States Patent [19]

Adachi et al.

[11] 4,183,829

[45] Jan. 15, 1980

[54] CATALYSTS FOR PURIFICATION OF EXHAUST GASES FROM INTERNAL COMBUSTION ENGINES

[75] Inventors: Shichiro Adachi, Ichikawa; Suguru Takayama, Tokyo; Takuo Sato, Nikaho, all of Japan

[73] Assignee: TDK Electronics Co. Ltd., Tokyo, Japan

[21] Appl. No.: 889,342

[22] Filed: Mar. 23, 1978

[30] Foreign Application Priority Data

Mar. 25, 1977 [JP] Japan .................................. 52/32892

[51] Int. Cl.$^2$ ........................ B01J 21/04; B01J 23/42; B01J 23/44; B01J 23/46
[52] U.S. Cl. ............................ 252/466 PT; 423/213.5
[58] Field of Search ............... 252/466 PT; 423/213.5

[56] References Cited

U.S. PATENT DOCUMENTS

| 3,257,163 | 6/1966 | Stiles .................................. 423/213.5 |
| 3,931,054 | 1/1976 | Lester ............................. 252/466 PT |
| 3,939,104 | 2/1976 | Campbell et al. ................. 423/213.5 |
| 3,956,459 | 5/1976 | Whitman et al. ................. 423/213.5 |
| 3,966,391 | 6/1976 | Hindin et al. .................... 252/462 X |

Primary Examiner—W. J. Shine
Attorney, Agent, or Firm—Cooper, Dunham, Clark, Griffin & Moran

[57] ABSTRACT

Catalysts for purification of exhaust gases from internal combustion engines which are a mixture of aluminum oxide, calcium oxide and one or more of the elements platinum, palladium and rhodium, and method for their use.

9 Claims, No Drawings

CATALYSTS FOR PURIFICATION OF EXHAUST GASES FROM INTERNAL COMBUSTION ENGINES

BACKGROUND OF THE INVENTION

This invention is concerned with catalysts and methods for reducing the toxicity of exhaust gases from internal combustion engines.

Recently, environmental pollution due to exhaust gases and other emissions from automotive and other internal combustion engines has become a critical environmental problem. No completely satisfactory solution has yet been devised.

The components of exhaust gases from internal combustion engines which are generally considered as the most harmful are carbon monoxide, nitrogen oxides and hydrocarbons which have failed to burn in the engine. Early attempts to avoid these problems were limited to improvements in engine design. More recently, other methods have been proposed, including after-burners designed to complete the ignition of unburned components and catalytic converters designed to convert the toxic components of the gases to non-toxic derivatives.

This invention is concerned more specifically with improved catalysts for use in catalytic converters.

The catalysts presently employed in converters of known types include, for example, oxides of metals, such as iron, manganese, copper, chromium and nickel, and mixtures of these. Noble metals, such as platinum and palladium, deposited on inert carriers, such as alumina and silica, have also been employed.

Two processes are generally utilized with catalytic converters. The first is a two-stage catalytic reaction system in which the exhaust gases exiting the engine are brought into contact with a reducing catalyst to reduce the oxides of nitrogen. The products of this reaction are normally mixed with secondary air and mixture brought into contact with an oxidizing catalyst which oxidizes the carbon monoxide and the unburned hydrocarbons. In a second or single-stage system, the exhaust gases are typically mixed with air to adjust the oxygen concentration and the mixture is brought into contact with a catalyst for simultaneous reduction of nitrogen oxides and oxidation of carbon monoxide and unburned hydrocarbons.

The single-stage process is generally preferred since it can be implemented in a relatively small catalyst vessel so that design problems for installation are alleviated. Additionally, the exothermic and endothermic reactions proceed simultaneously so that overall conversion may be conducted with a high degree of efficiency. Amongst the disadvantages of the single-stage process are that with conventional catalysts, the range of oxygen concentrations for satisfactory reaction is critical and difficult to adjust, and the simultaneous catalytic oxidation and reduction reactions require the use of separate catalysts and the presence of these in one reaction vessel may result in a reduction in the efficiency of each of them.

THE INVENTION

The catalysts of this invention are designed to alleviate the problems aforementioned. The catalysts comprise aluminum oxide containing calcium oxide, together with platinum, palladium, rhodium, or mixtures of all of these platinum-family elements. While appreciable variation can be tolerated without adverse significant effect, it has been observed that the catalysts operate most efficiently when they contain from 0.1 to 10 weight percent of calcium, together with from 0.001 to 2.0 weight percent of platinum, or 0.005 to 1.0 weight percent of palladium, or from 0.005 to 1.0 weight percent of rhodium, or mixtures of these elements such as a mixture of 0.001 to 2.0 weight percent platinum and from 0.005 to 1.0 weight percent rhodium. The preferred weight percent of the respective components are: calcium oxide, 0.2 to 5.0 weight percent; rhodium, 0.001 to 1.0 weight percent.

The catalysts are more effective if some of the aluminum oxide is in the corundum form. It is preferred that at least half of the aluminum oxide be in this form. However, any amount up to 90 weight percent will be effective.

The use of the catalysts of this invention has been observed to increase the rate of conversion of the harmful components of the exhaust gas to non-toxic derivatives. Additionally, the requirements with respect to oxygen concentration are not as stringent as with catalysts previously employed.

The catalysts of this invention may be conveniently prepared by any of a number of procedures. For example, calcium oxide may be prepared by heat decomposition of a suitable heat labile calcium derivative, such as hydroxide, chloride, carbonate, nitrate or acetate. The oxide thus prepared can be mixed with aluminum oxide, the mixture molded to the desired shape and thereafter sintered, typically at a temperature of from 400° to 1000° C., for a sufficiently long period to insure as complete a conversion to oxide as possible.

An alternate, and perhaps more convenient, method is to first mold the selected aluminum oxide into a suitable form, for example a honeycomb structure, impregnate the thus-formed carrier with a solution of a heat decomposable calcium salt and thereafter dry and sinter for about one-half hour at a temperature of from 400° to 1100° C.

The platinum, palladium or rhodium metal is conveniently deposited on the aluminum oxide-calcium oxide carrier by impregnation of a water-soluble salt, followed by drying and heating at a temperature of from about 300° to 900° C. or other convenient temperature which will decompose the salt and fix the metal on the carrier. Heating may be effected in a reducing, neutral or oxidizing atmosphere.

The catalysts of this invention are employed for the purification of exhaust gases by contacting the gases with the catalysts, suitably at an elevated temperature which, in the usual case, will be the temperature of the exhaust gases as they exit the engine. Typically, this temperature is from about 100° C. to 800° C., although in particular cases there will be considerable variation from this range. The catalysts will normally be carried in a catalytic converter type device which will be designed as an integral part of the exhaust system of the engine.

The following non-limiting examples are given by way of illustration only:

EXAMPLE 1

Two catalysts are prepared. Catalyst (a) was prepared from substantially spherical 100% intermediate porous alumina with a particle diameter of ^0 mm. Catalyst (b) was prepared from a similar spherical alumina containing 50 weight percent corundum (α- alumina) and 50 weight percent intermediate alumina. The catalysts were prepared by impregnating the separate samples with an aqueous solution of calcium sulfate. The impregnated samples were dried in air for 2 hours at 700° C. Analysis of the samples showed that the calcium content was 1.0 weight percent as calcium oxide equivalent. The samples were then immersed in an aqueous solution of platinum chloride containing hydrochloric acid, removed and dried for 7 hours at 100° C. They were then heated in a circulating nitrogen atmosphere at 600° C. to form metallic platinum. Analysis showed that each catalyst contained 0.004 weight percent of platinum.

The catalysts (400 cc) were separately filled in a quartz glass reaction tube with an inside diameter of 34 mm and a length of 800 mm. The tubes were then heated at about 500° C. for approximately 1 hour. The reaction tubes were then connected with a suitable system and a gas mixture comprising 1.2% carbon monoxide, 0.1% propylene, 0.1% nitrogen monoxide, 10% water vapor and a balance of nitrogen was passed through at a space velocity of 20,000 hour$^{-1}$ while holding the catalyst temperature at 600° C. The gas composition was monitored both upstream and downstream from the reaction tube by gas chromatography and with a chemi-luminescence nitrogen oxide analyzer. The results of the analysis are shown in Table I:

TABLE I

| Catalyst | Purifying Rate | | |
|---|---|---|---|
| | CO | $C_3H_6$ | NO |
| (a) | 80% | 65% | 70% |
| (b) | 85% | 80% | 90% |

It will be observed that better results were obtained with catalyst (b) containing 50% corundum.

EXAMPLE 2

The procedure of Example 1 was utilized with the two types of alumina, calcium sulfate and palladium chloride to prepare catalyst samples containing 1.0 weight percent calcium oxide equivalent and 0.1 weight percent of palladium. The gas mixture of Example 1 was contacted with this catalyst using the procedure of Example 1. The results are shown in Table II:

TABLE II

| Catalyst | Purifying Rate | | |
|---|---|---|---|
| | CO | $C_3H_6$ | NO |
| (a) | 80% | 75% | 70% |
| (b) | 85% | 90% | 96% |

It will be observed that the catalyst containing the corundum was again somewhat higher in activity than the catalyst which did not contain this material.

EXAMPLE 3

The procedure of Example 1 was repeated with aluminum oxide samples, calcium sulfate and rhodium chloride to prepare catalyst containing 1.0 weight percent calcium oxide equivalent and 0.005 weight percent rhodium. The catalysts were similarly tested except that the gas-catalyst contact temperature was 400° C. The results are shown in Table III:

TABLE III

| Catalyst | Purifying Rate | | |
|---|---|---|---|
| | CO | $C_3H_6$ | NO |
| (a) | 80% | 95% | 100% |
| (b) | 99% | 99% | 100% |

EXAMPLE 4

Catalysts similar to catalyst (b) of Example 1 were similarly prepared except that the amount of calcium oxide in the catalyst was varied while holding the platinum content substantially constant at 0.04 weight percent metal equivalent. The catalysts were tested as in Example 1 with the same gas mixture. The results are shown in Table IV:

TABLE IV

| Catalyst CaO | Purifying Rate | | |
|---|---|---|---|
| | CO | $C_3H_6$ | NO |
| 0 wt % | 60% | 78% | 62% |
| 0.25 wt % | 70% | 80% | 71% |
| 0.5 wt % | 75% | 81% | 78% |
| 1.0 wt % | 85% | 80% | 90% |
| 2.0 wt % | 86% | 81% | 90% |

It will be observed that the efficacy of the catalysts increased in direct proportion to the calcium oxide content. Similar results were observed with other catalysts in which the platinum was replaced with palladium or rhodium.

EXAMPLE 5

This example illustrates the effect of increasing the platinum content of a series of catalysts similar to catalyst (b) of Example 1 while holding the calcium oxide equivalent substantially constant at 1.0 weight percent. The results are shown in Table V:

TABLE V

| Catalyst Pt | Purifying Rate | | |
|---|---|---|---|
| | CO | $C_3H_6$ | NO |
| 0.01 wt % | 80% | 73% | 85% |
| 0.04 wt % | 85% | 80% | 90% |
| 0.08 wt % | 87% | 85% | 90% |
| 0.1 wt % | 88% | 87% | 91% |
| 0.5 wt % | 90% | 90% | 90% |

It will be observed that the efficacy of the catalysts increased with increase in platinum content.

Table VI shows the results of similar experiments in which the platinum was replaced with rhodium and the catalyst content held substantially constant at 1.0 weight percent as calcium oxide equivalent.

TABLE VI

| Catalyst Rh | Purifying Rate | | |
|---|---|---|---|
| | CO | $C_3H_6$ | NO |
| 0.001 wt % | 90% | 93% | 95% |
| 0.003 wt % | 95% | 98% | 99% |
| 0.005 wt % | 99% | 99% | 100% |
| 0.01 wt % | 100% | 100% | 100% |
| 0.1 wt % | 100% | 100% | 100% |

It will be observed that the purification rate increases with increasing rhodium content.

EXAMPLE 6

Tables VII through X below show the results of a number of experiments utilizing other catalysts of this invention. The gas mixture tested in the experiments, the results of which are shown in Tables VII, VIII and IX, contained 1% oxygen. A gas mixture utilized in the experiments, the results of which are reported in Table X, was the identical gas mixture employed in Examples 1 through 5.

TABLE VII

α-alumina 50%, intermediate alumina 50%
Pt 0.04 wt %, $O_2$ 1%

| Catalyst | Purifying Rate | | |
|---|---|---|---|
| CaO | CO | $C_3H_6$ | NO |
| 0 wt % | 60% | 78% | 62% |
| 0.1 wt % | 65% | 80% | 66% |
| 0.25 wt % | 70% | 80% | 71% |
| 0.5 wt % | 75% | 81% | 78% |
| 1.0 wt % | 85% | 80% | 90% |
| 2.0 wt % | 86% | 81% | 90% |
| 5.0 wt % | 84% | 80% | 90% |
| 10.0 wt % | 85% | 80% | 90% |

TABLE VIII

α-alumina 50%, intermediate alumina 50%
CaO 1.0 wt %, $O_2$ 1%

| Catalyst | Purifying Rate | | |
|---|---|---|---|
| Pt | CO | $C_3H_6$ | NO |
| 0 wt % | 2% | 0% | 0% |
| 0.0005 wt % | 65% | 40% | 10% |
| 0.01 wt % | 80% | 73% | 85% |
| 0.04 wt % | 85% | 80% | 90% |
| 0.08 wt % | 87% | 85% | 90% |
| 0.1 wt % | 88% | 87% | 91% |
| 0.5 wt % | 90% | 90% | 90% |
| 1.0 wt % | 91% | 93% | 90% |
| 2.0 wt % | 93% | 95% | 93% |

TABLE IX

α-alumina 50%, intermediate alumina 50%
CaO 1.0 wt %, $O_2$ 1%

| Catalyst | Purifying Rate | | |
|---|---|---|---|
| Rh | CO | $C_3H_6$ | NO |
| 0.0001 wt % | 0% | 0% | 0% |
| 0.001 wt % | 90% | 93% | 95% |
| 0.003 wt % | 95% | 98% | 99% |
| 0.005 wt % | 99% | 99% | 100% |
| 0.01 wt % | 100% | 100% | 100% |
| 0.1 wt % | 100% | 100% | 100% |
| 1.0 wt % | 100% | 100% | 100% |
| 2.0 wt % | 100% | 100% | 100% |

TABLE X

α-alumina 50%, intermediate alumina 50%
CaO 1.38 wt %

| Catalyst (wt %) | | $O_2$ (%) | | | | | | | |
|---|---|---|---|---|---|---|---|---|---|
| | | 0.8 | | | 1.3 | | | 1.6 | |
| | | Purifying Rate (%) | | | | | | | |
| Pt | Rh | CO | $C_3H_6$ | NO | CO | $C_3H_6$ | NO | CO | $C_3H_6$ | NO |
| 0 | 0.005 | 65 | 83 | 99 | 99 | 98 | 95 | 98 | 82 | 42 |
| 0.0075 | 0.0025 | 57 | 30 | 79 | 99 | 98 | 96 | 100 | 98 | 60 |
| 0.0075 | 0.005 | 67 | 81 | 100 | 99 | 100 | 99 | 100 | 98 | 57 |
| 0.15 | 0.0025 | 67 | 63 | 98 | 100 | 99 | 96 | 100 | 99 | 50 |
| 0.15 | 0.005 | 66 | 79 | 99 | 100 | 99 | 96 | 99 | 98 | 46 |

The experiments reported in Table VII were with a series of catalysts in which the platinum content was held constant while the calcium content was increased.

In the experiments reported in Table VII, the calcium content was held constant while increasing the platinum content.

The experiments reported in Table IX are similar to those reported in Table VIII except that the platinum was replaced with rhodium.

The experiments reported in Table X relate to a series of experiments in which the calcium content of the catalyst was held constant while utilizing mixtures of platinum and rhodium in the separate catalysts.

What is claimed is:

1. A catalyst for the purification of exhaust gases from internal combustion engines consisting essentially of (1) a carrier which is aluminum oxide containing from 0.1 to 10 weight percent of calcium oxide, from 50% to 90% of the aluminum oxide being in the corundum form, the carrier supporting (2) at least one element selected from the group consisting of from 0.001 to 2.0 weight percent of platinum, from 0.005 to 1.0 weight percent of palladium and from 0.005 to 1.0 weight percent of rhodium.

2. A catalyst of claim 1 containing from 0.001 to 2.0 weight percent platinum.

3. A catalyst of claim 1 containing from 0.005 to 1.0 weight percent palladium.

4. A catalyst of claim 1 containing from 0.005 to 1.0 weight percent rhodium.

5. A catalyst of claim 1 containing from 0.001 to 2.0 weight percent platinum and from 0.005 to 1.0 weight percent rhodium.

6. A catalyst of claim 1 containing from 0.001 to 2.0 weight percent platinum.

7. A catalyst of claim 1 containing from 0.005 to 1.0 weight percent palladium.

8. A catalyst of claim 1 containing from 0.005 to 1.0 weight percent rhodium.

9. A catalyst of claim 1 containing from 0.001 to 2.0 weight percent platinum and from 0.005 to 1.0 weight percent rhodium.

* * * * *